United States Patent [19]

Tamagawa

[11] Patent Number: 5,369,451
[45] Date of Patent: Nov. 29, 1994

[54] NOSE PADS OF SPECTACLES

[75] Inventor: Yuzo Tamagawa, Sabae, Japan

[73] Assignee: Yugen Kaisha Tamagawa Kogyo, Fukui, Japan

[21] Appl. No.: 132,900

[22] Filed: Oct. 7, 1993

[30] Foreign Application Priority Data

Jul. 9, 1993 [JP] Japan ............... 5-042896[U]

[51] Int. Cl.5 ............................................. G02C 5/12
[52] U.S. Cl. ................................... 351/136; 351/78; 351/132
[58] Field of Search ............. 351/136, 137, 138, 139, 351/65, 76, 78, 79, 80, 81, 82, 88, 131, 132; 2/446

[56] References Cited

U.S. PATENT DOCUMENTS 4,822,159 4/1989 Gaiser ..................... 351/136

FOREIGN PATENT DOCUMENTS 8502913 7/1985 WIPO ..................... 351/139

*Primary Examiner*—William L. Sikes
*Assistant Examiner*—Hung Xuan Dang
*Attorney, Agent, or Firm*—Nikaido, Marmelstein, Murray & Oram

[57] ABSTRACT

Disclosed is a nose pad of spectacles is a hollow body having a resilient member fitted therein. The resilient member has a joint piece integrally connected thereto, projecting from the hollow body. The three-dimensional shape of the resilient member is yieldingly deformable in the hollow space of the nose pad in response to a force applied to the nose pad. The joint piece is changeable its position in all directions so as to fit itself along either side of the nose. The required orientation of each nose pad can be automatically caused by deformation of the resilient member in response to the counterforce from the nose to the nose pad.

3 Claims, 2 Drawing Sheets

NOSE PADS OF SPECTACLES

BACKGROUND OF THE INVENTION

1. Field of the Invention

The present invention relates to an improvement in or relating to spectacles, particularly the structure of nose pad of spectacles.

2. Description of Related Art

When wearing spectacles, the spectacles are supported by the end pieces of the temples on the ears and by the nose pads on the opposite sides of the nose. Recently, spectacles which use frames of a relatively light-metal such as titanium and lenses of a relatively light material other than glass, such as coated plastics have been popular. Thanks to use of light materials the weight of such spectacles is reduced substantially. The weight distribution, however, is biased against the frame, and if a person wears such light-weighted spectacles for a long time, he is liable to feel somewhat a pain on either side of his nose.

Also, the spectacles are liable to move down along the nose to pull the ears by the temples of the frame, thus causing the person to feel a pain in the cars. Still disadvantageously, the moving-down of the spectacles along the nose will put the lenses in defocussing position, thereby blurring the sight and causing an ill effect on his eyesight. The nose pads are pivotally fixed by very small screws to the small box-like objects, which are soldered to the metal pieces extending from the rims of the front frame or from the plastic lenses themselves in case the spectacles is frameless type using plastic lenses. Thanks to the pivotal fixing of the nose pads and thanks to the loose attaching of the very small screws to the small box-like objects the nose pads are somewhat movable so as to fit on the opposite sides of the nose.

People's nose shapes are variant respectively and such pivotal fixing of the pads and loose attaching of screws cannot be enough to every persons. Accordingly the frame is adjusted personally by somewhat bending, thereby permitting the nose pads to be fitted on the opposite sides of the nose at the cost of undesired shift of the spectacles out of position. Assume that his body moves quickly particularly in exercise. The nose pads may be raised from the nose, allowing the spectacles to move out of position because the frame cannot be kept stable in position by the raised nose pads. In an attempt to permit the nose pads to be fitted on the opposite sides of the nose by bending the supporting metals of the nose pads, the soldering may be often destroyed, and thereby causing the nose pads to be removed from the front.

SUMMARY OF THE INVENTION

In view of the above one object of the present invention is to provide nose pads of spectacles which are permitted to fit on the nose no matter what shape it may have, not requiring the bending of the supporting metals of the nose pads.

Another object of the present invention is to provide nose pads of spectacles which assure that the spectacles are kept in position against quick moves of one's body.

As is well known, a conventional nose pad is a solid plastic body having a metal piece embedded and projecting therefrom, which metal piece is fixed to an ejection from the rim of the front frame or from the plastic lenses themselves in case the spectacles is frameless type using plastic lenses. In contrast, a nose pad according to the present invention is a hollow body having a resilient member snugly fitted therein. The resilient member has a joint piece integrally connected thereto, projecting from the hollow body. It has a three-dimensional, folded shape yieldingly deformable in response to a force applied to the nose pad.

With this arrangement each pad when fixed to the spectacles by its joint piece can change its position in all directions so as to fit itself along either side of the nose. The required orientation of each nose pad can be automatically caused by deformation of the resilient member in response to the counter-force from the nose to the nose pad. Thus, the nose pad has a great facility in fitting the nose, compared with the conventional nose pad. The deformable resilient member assures that the nose pad is applied evenly to the nose without causing uneven distribution of the applied force on the nose side, and that the nose pad is prevented from leaving apart from the nose side even if the spectacles are moved for ;instance in exercise, thus keeping the lenses in position.

The hollow body may have a plurality of small apertures on its front side, thereby allowing the nose skin to somewhat invade in these apertures to contribute to the anti-slipping of the nose pad on the nose, and at the same time, reducing the nose pad area which prevents the nose skin from being exposed to the surrounding air.

Also, the hollow body may have an opening at the lower part of the rear surface of the body, thereby facilitating the removal of dust from said hollow space.

Other objects and advantages of the present invention will be understood from preferred embodiments of the present invention, which are shown in accompanying drawings.

DESCRIPTION OF THE PREFERRED EMBODIMENTS

Figure 4:
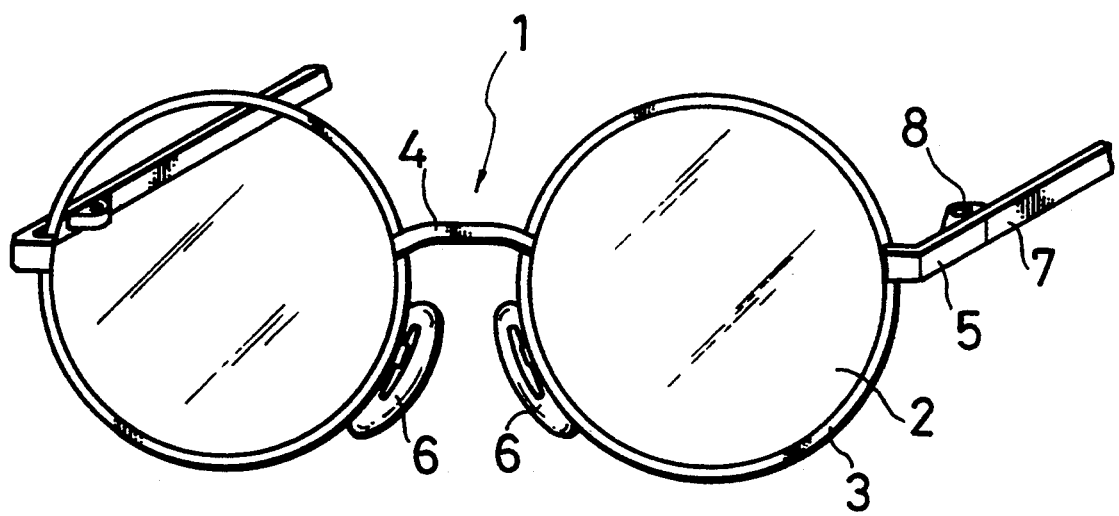
FIG. 4 is a perspective view of spectacles having two nose pads according to the present invention.

Referring to FIG. 4, a frame is composed of a front 1 and two temples 7, and the front 1 is composed of two opposite rims 3 integrally connected by a bridge 4. These rims 3 hold two lenses 2. Side rear-extensions 5 are fixed to the rims 3 and hinged to the temples 7 by screws 8. Two nose pads 6 are fixed to the rims 3 of the front 1 below the bridge 4.

Figure 1:
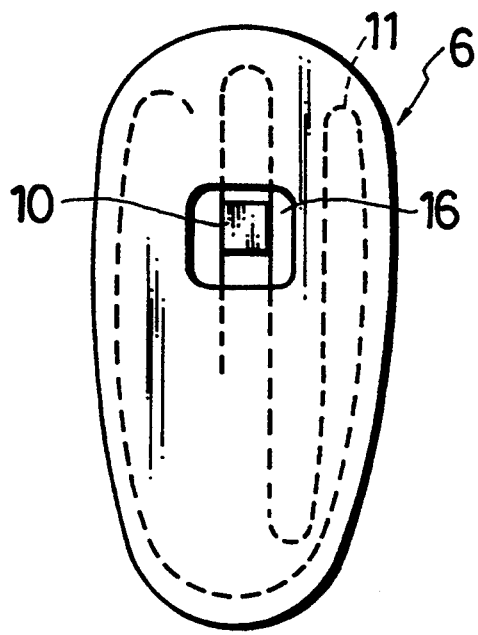
FIG. 1 is a rear view of a nose pad according to one embodiment of the present invention.
Figure 2:
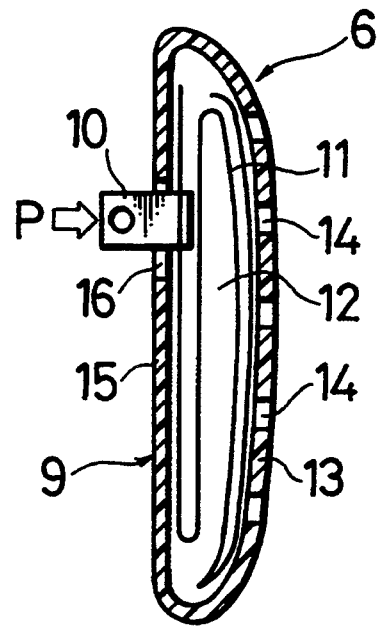
FIG. 2 is a longitudinal section of the nose pad.
Figure 3:
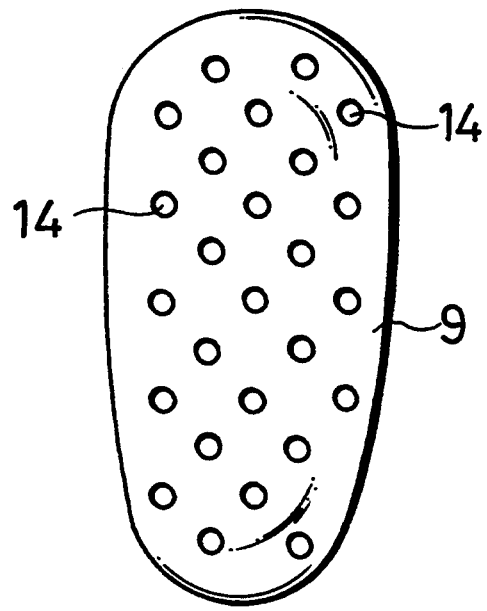
FIG. 3 is a front view of the nose pad.

Referring to FIGS. 1, 2 and 3, a nose pad 6 comprises a hollow body 9, a resilient member 11 in the form of folded elastic wire and a joint piece 10 connected to the resilient member. The hollow body 9 has a hollow space 12, and its smooth front surface 13, which is to be applied to the nose, has a plurality of small apertures 14 as best seen from FIG. 3. Its rear surface 15 has an opening 16. The folded wire 11 is snugly contained in the hollow space 12, allowing the joint piece 10 to project from the opening 16 on the rear side 15 of the hollow body 9. The joint piece 10 is fixed to the metal extending from the front 1.

The elastic wire 11 is thin metal of increased elasticity, and is folded in a three dimensional form to snugly fit in the hollow space 12. A hollow body 9 may be made by integrally connecting a front part 13 and a rear part 15 after the resilient member 11 is put in the space defined by these separate parts. Application of a force P to the Joint piece 10 will cause deformation of the resilient member 11.

Such a force P is caused by wearing the spectacles to support the frame on the nose, and the resilient member 11 will be deformed with the applied force, which varies with the move of one's body. The deformation of the resilient member thus caused assures that the front surface 13 of the nose pad 6 is kept close to either side of the nose. The small apertures 14 of the front surface 13 of the nose pad 6 permit invasion of the nose skin, thereby contributing to the stable stay of the nose pad 9 on the nose, and at the same time, permitting exposure of the nose skin to the surrounding air in these apertured area 14. If the nose pad had no small apertures on its front side, the part of the nose to which the nose pad is applied would become reddish, causing some pain.

Figure 5:
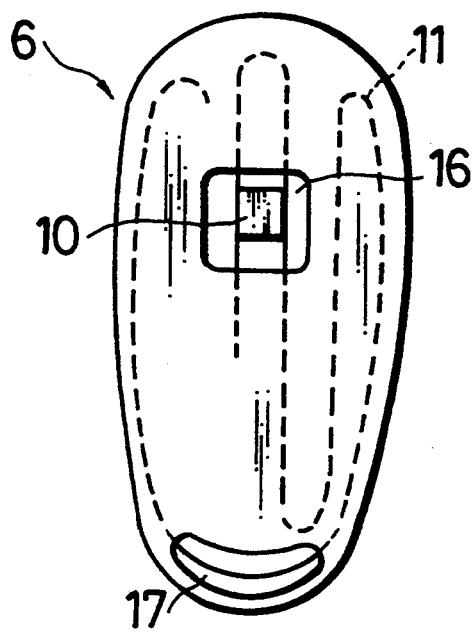
FIG. 5 is a rear view of a nose pad according to another embodiment of the present invention.
Figure 6:
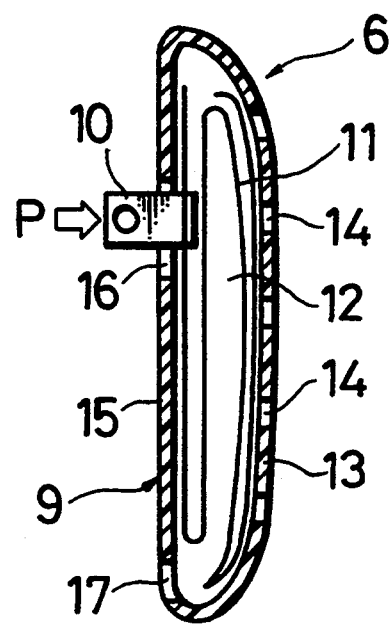
FIG. 6 is a longitudinal section of the nose pad according to another embodiment of the present invention.

Referring to FIGS. 5 and 6, the hollow body 9 may have an opening 17 at the lower part of the rear surface of the body, thereby facilitating the removing of dust from the hollow space 12.

The yieldingly deformable resilient member 11 can be easily deformed when being compressed, bent or twisted against an applied force, and therefore, the nose pad can fit on the nose even if the nose pad is fixed to the rim of the front by its joint metal 10. In wearing the spectacles the folded wire 11 may be somewhat deformed by the weight of the front, and when the front is raised apart from the nose, the folded wire is allowed to extend in such a compensating manner that each nose pad 6 remains on the nose. The nose pad may be made of any material which is appropriate for the purpose, and the wire may take any three-dimensional folded shape.

As may be understood from time above, use of nose pads according to the present invention provides advantages as follows: thanks to an increased fitness of the nose pads to the nose no adjustment of time frame is required to various shapes of noses; thanks to deformation of the resilient member within the hollow space the close contact of the nose pads on the nose is assured all the time even if one's body moves vigorously in exercise; thanks to the recovery of resilient member the spectacles are prevented from moving out of position thus to be kept in position all the time; thanks to the facilitating of fitting to the nose the weight of the spectacles can be evenly distributed, thus causing no unpleasing weight in wearing the spectacles for a long time.

I claim:

1. A nose pad of spectacles comprising a hollow body having a resilient member fitted therein, three-dimensional shape of said resilient member being yieldingly deformable in the hollow space of the hollow body, said hollow body having an opening on its rear side, and said resilient member having a joint piece projecting from said opening.

2. A nose pad of spectacles according to claim 1, wherein said hollow body has a plurality or small apertures on its front side.

3. A nose pad for spectacles according to claim 2, wherein said hollow body has another opening at lower part of the rear surface of the body, thereby facilitating removal of dust from said hollow space.

* * * * *